Aug. 12, 1952 J. DULAIT 2,606,659
PROCESS AND APPARATUS FOR SEPARATING FINELY DIVIDED SUBSTANCES
Filed April 4, 1949 2 SHEETS—SHEET 2
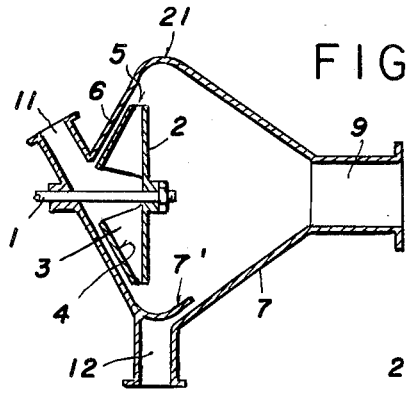
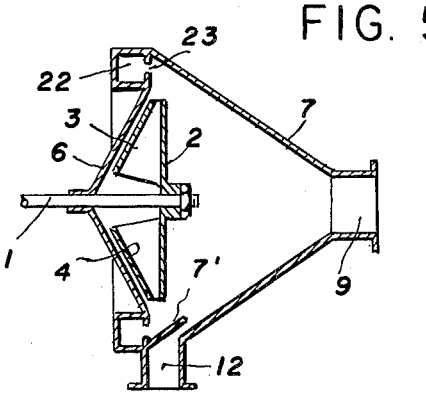
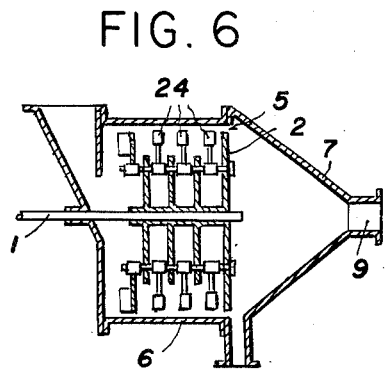
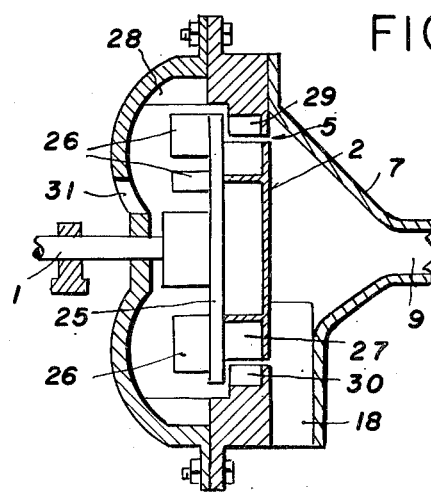
INVENTOR
JEAN DULAIT,
BY Wenderoth, Lind & Ponack
ATTORNEYS Patented Aug. 12, 1952

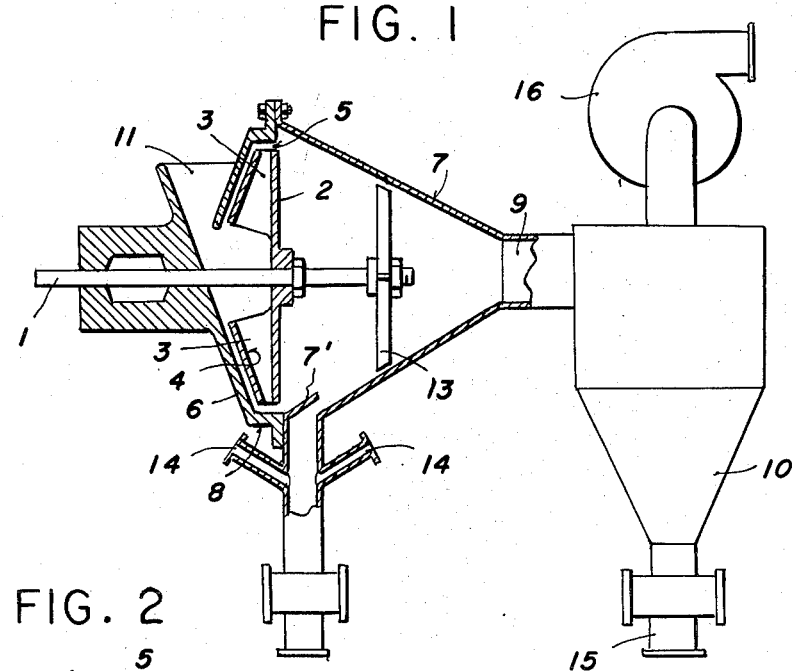
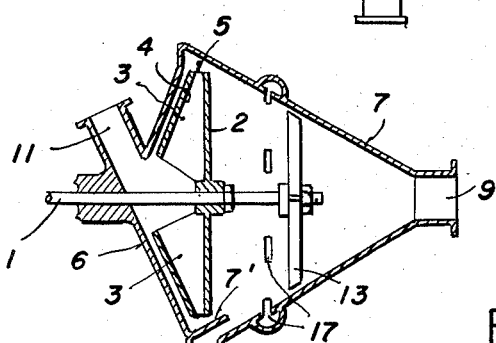
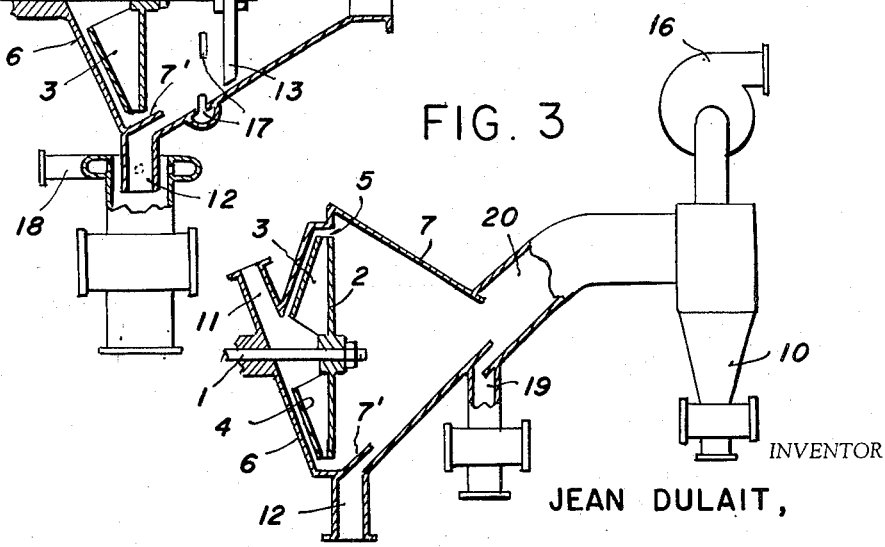

2,606,659

UNITED STATES PATENT OFFICE 2,606,659

PROCESS AND APPARATUS FOR SEPARATING FINELY DIVIDED SUBSTANCES

Jean Dulait, Brussels, Belgium

Application April 4, 1949, Serial No. 85,408
In Belgium April 6, 1948

5 Claims. (Cl. 209—144)

The present invention relates to a process and an apparatus for selectively separating particles of different size subjected to the action of a gaseous current. It has for its object to perform the separation so that a very accurate regulation of the separation, i. e. a selection of particles of a predetermined size, be possible.

In accordance with my invention the material to be separated is projected, in form of a sheet, in presence of a current of air or other gas, against a deflecting surface, so that the larger particles are rejected outside of the sheet and fall down, while the smaller particles are carried away by the gaseous current.

The air or other gas necessary for carrying the particles may be fed together with the material, or/and separately, near the place where the sheet is formed. Additional injections of air or gas may also be effected in the outlet conduits for the particles which have already undergone a preliminary separation.

The sheet of divided material is advantageously of annular shape and is projected as a radial or conical sheet by centrifugal force against a peripheral surface. To that end, the apparatus according to this invention comprises a rotor provided with blades or vanes, and having a peripheral outlet opening or slit directed towards a deflecting wall, in form of a surface of revolution, preferably of conical shape, outlet conduits being provided for the separated particles.

In an advantageous embodiment of the apparatus, the rotor is closed on one side by a disc and rotates in a casing of generally conical shape. The material to be separated is fed along the axis of the rotor, with or without current of air.

Additional air inlets may be provided in proximity to the peripheral opening of the rotor and/or in the conical casing. This apparatus may be placed immediately behind, or combined with, a rotary crusher.

With reference to the accompanying drawings, which illustrate diagrammatically various embodiments of the invention:

Fig. 1 is an axial section of one embodiment.

Figs. 2 to 5 are respectively axial sections of further embodiments.

Fig. 6 also shows in axial section a selecting apparatus combined with a beater mill.

Fig. 7 likewise shows a selecting apparatus combined with a mill with blades and peripheral chambers.

In Fig. 1, the rotor comprises a shaft 1 on which is secured a disc 2 carrying radial blades 3 to which is fixed an annular plate 4 of slightly conical shape so as to leave at the periphery a relatively narrow opening or slit 5. This rotor revolves in a stator made of two parts, one part 6 extending along the plate 4 and merging into a cylindrical or slightly conical portion 8 connected to the other part 7 of the stator, which is of conical shape and provided at its end with an outlet opening 9 which may be connected to a cyclone 10 or a deposit chamber.

The material to be separated being fed centrally through a hopper 11 is sucked by the rotor and forcibly ejected in form of a conical sheet through that slit 5 and the annular space comprised between the disc 2 and the wall 8. The sheet strikes against the conical surface 7 and the larger particles are thrown back and fall down towards the outlet conduit 12 the opening of which is protected against the direct projection of the sheet by a portion 7' of the deflecting surface 7. The fine particles are carried along the cone towards and through the opening 9, their movement being accelerated if desired by revolving blades 13.

Air inlets such as 14 may be provided in the conduit 12, as shown in Fig. 1, or at other places.

The fines in this example are collected at the end 15 of the cyclone, while the air is evacuated through the fan 16.

The construction as above described permits of adjusting with great accuracy the separation of the particles, by determining the direction of the sheet with respect to surface 7, by varying the rotational speed of the rotor and of the accelerator 13, and also by acting on the air inlets.

Fig. 2 shows an embodiment in which the sheet of material ejected by the rotor is directed radially. In front of the accelerator 13 there is provided a series of air inlets 17 for the purpose of admitting a current of so called cleansing air which stirs the particles and loosens from the larger particles the fines that may be adhering thereto. This figure also shows a peripheral air inlet 18 surrounding the outlet conduit 12 for the larger particles.

In Fig. 3, I have shown a selecting apparatus for producing a conical sheet, in which the part 7 is shaped as a cone with an upwardly inclined axis. Another feature resides in the arrangements of an outlet 19 for the fines at the end of the cone 7, whereby the whirling of the material at that place is made use of to separate the less fine particles. The finer particles are evacuated through the cylindrical pipe 20 and the cyclone 10, which latter may be of the usual construction.

In the apparatus shown in Fig. 4, the rotor ejects a radial sheet and the conical surface 7 is connected to the part 6 of the stator by a rounded wall 21 which contributes in causing the larger particles to separate from the fines and be thrown towards the axis of the apparatus. The fines, owing to their smaller momentum, follow more closely the air stream flowing through the apparatus and are delivered through the central opening 9, while the larger particles fall down and are collected in the conduit 12.

In the arrangements as described above, the material is fed into the apparatus together with air admitted therewith. It is however possible to introduce at least part of the air separately, as in the example shown in Fig. 5, where air is introduced through a peripheral ring 22 having in its front ports 23 through which the air, which may be under pressure, is admitted in proximity to the sheet ejected by the rotor.

The selecting apparatus may be placed behind a crusher or mill, or in some cases it can be advantageously combined with the same.

Fig. 6 illustrates diagrammatically a mill of known construction with hammers 24, in which the rotor is provided at one end with a disc 2 leaving, at its periphery, in the stator 6 an annular slit 5 through which the crushed material is ejected in form of a conical sheet, which strikes against the conical surface 7 of the rear wall of the combined apparatus.

In Fig. 7, is illustrated a crusher of the type comprising a rotor 25 with front blades 26 and rear blades 27 rotating in a stator provided with peripheral front chambers 28 and rear chambers 29.

A disc 2 is interposed between the blades 27 and the conical wall 7.

Furthermore a ring 30 is arranged in the same plane as the disc 2, between the chambers 29 and the conical wall 7, opposite the space which separates the chambers 29 from the zone swept by the blades 27. The material to be crushed is fed through the opening 31. It is crushed between the rotor and the stator chambers and is projected in form of a sheet through the annular slit 5 between the disc 2 and the ring 30. The larger particles fall on the lower part of the rear wall 7 and are collected in the conduit 12, while the fines escape through the opening 9 and may be led to a cyclone or to another apparatus in which they are separated from the air.

It should be understood that air is mentioned here by way of example only and that other gases may be used when required by the nature of the materials to be separated.

I claim:

1. In a centrifugal selecting apparatus, a stator having a conical peripheral wall provided with an outlet at its apex and an outlet at its base, an annular wall extending radially from the base of said conical wall a short distance towards the central axis of the conical wall, a rotor having a radial circular wall situated within the central opening of said annular wall, said annular stator wall and said rotor wall substantially closing said conical stator wall at its base and forming a narrow annular slit between said annular wall and said rotor wall, said slit opening substantially in the axial direction of the rotor a short radial distance from the conical wall for projecting material to be selected from the closed base portion of the stator against a narrower portion of the conical wall.

2. In a centrifugal selecting apparatus as claimed in claim 1, a conduit connected to said outlet adjacent the annular wall, and a gas inlet in said conduit.

3. In a centrifugal selecting apparatus as claimed in claim 1, a conduit connected to said outlet adjacent the annular wall, a gas inlet in said conduit, and a deflecting wall covering said outlet against the web of material issuing from the slit left between the circular rotor wall and the annular stator wall.

4. A process for selectively separating finely divided material comprising projecting said material in the form of an annular sheet in the presence of a gaseous current by rotation against a stationary annular deflecting surface, reducing the sheet of projected material in thickness to a thin web by passing it through a narrow slit before deflection for permitting deflecting of smaller particles from the path of larger particles without interfering therewith, projecting the web axially towards the deflecting surface and providing a conical form thereto, the web reaching the deflecting surface while still comparatively thin, causing the larger particles to be rejected by the reflecting surface and to fall down and causing the smaller particles to be carried away by the gaseous current.

5. In a centrifugal selecting apparatus, a stator having a conical peripheral wall provided with an outlet at its apex and an outlet at its base, an annular wall extending radially from the base of said conical wall a short distance towards the central axis of the conical wall, a hollow rotor composed of two radial walls with intermediate projecting blades, a rear central inlet opening and a peripheral outlet, the cross section of the rotor substantially decreasing from said central inlet toward the peripheral outlet, said peripheral outlet being a narrow slit, said rotor constituting in combination with said annular wall of said stator closing means for the base wall of the stator cone, said narrow outlet slit of said rotor being situated in proximity to said annular wall and at a short distance from the base portion of the cone, whereby the rotor affords a vigorous and efficient projection of the material in the form of a very thin web, at a suitable angle against the cone.

JEAN DULAIT.

REFERENCES CITED

The following references are of record in the file of this patent:

UNITED STATES PATENTS

| Number | Name | Date |
| --- | --- | --- |
| 465,582 | Mundy | Dec. 27, 1891 |
| 609,537 | Emerick | Aug. 23, 1898 |
| 812,972 | Baldwin | Feb. 20, 1906 |
| 840,818 | Beack | Jan. 8, 1907 |
| 990,157 | Morscher | Apr. 18, 1911 |
| 1,263,394 | Emerick | Apr. 23, 1918 |
| 1,479,754 | Stebbins | Jan. 1, 1924 |
| 1,509,914 | Stebbins | Sept. 30, 1924 |
| 1,884,152 | Nye | Oct. 25, 1932 |
| 1,884,153 | Nye | Oct. 25, 1932 |
| 2,069,735 | Metcalf | Feb. 2, 1937 |
| 2,276,761 | Carey | Mar. 17, 1942 |